United States Patent
Kuribayashi et al.

[11] Patent Number: 5,252,379
[45] Date of Patent: Oct. 12, 1993

[54] EMBOSSED PROCESS PAPER AND PRODUCTION THEREOF

[75] Inventors: Takeshi Kuribayashi; Haruo Yoshikawa; Yoshio Matsumoto, all of Toda, Japan

[73] Assignees: Sanyo Kakoshi Kabushiki Kaisha, Toda; Showa Denko Kabushiki Kaisha, Tokyo, both of Japan

[21] Appl. No.: 795,840

[22] Filed: Nov. 21, 1991

[30] Foreign Application Priority Data

Nov. 28, 1990 [JP] Japan ................... 2-322406

[51] Int. Cl.$^5$ .............................. B32B 31/16
[52] U.S. Cl. ................... 428/141; 156/244.11; 156/244.14; 156/244.15; 156/244.23; 156/244.24; 156/244.27; 428/516; 428/517; 428/519; 428/521; 428/523; 428/904
[58] Field of Search .............. 156/244.11, 244.14, 156/244.15, 244.23, 244.24, 244.27, 230, 232, 238, 289, 209, 219, 220; 428/141, 163, 167, 174, 516, 517, 519, 521, 523, 904

[56] References Cited

U.S. PATENT DOCUMENTS 4,569,712  2/1986  Shibano et al. ............... 156/244.14
5,098,497  3/1992  Brinley ........................ 156/244.11

*Primary Examiner*—Caleb Weston
*Attorney, Agent, or Firm*—Oblon, Spivak, McClelland, Maier & Neustadt

[57] ABSTRACT

An embossed process paper for transfer, adapted to be used for forming a dry type of synthetic leather, includes a backing paper (1), a mixed resin (2) of polypropylene with polyethylene laminated on the surface of the backing paper (1) and a homopolypropylene resin (3) laminated on the surface of the mixed resin (2). Both the resins are laminated together at a total resin coat thickness of 30 to 120 μm, the thickness of the mixed resin (2) accounting for 50 to 20% of the total resin coat thickness and the thickness of the resin (3) accounting for 50 to 80% of the total resin coat thickness, both the resins having thereon a given embossed pattern having a depth of 20 to 150 μm, and the backing paper (1) having a smooth back side.

3 Claims, 1 Drawing Sheet

EMBOSSED PROCESS PAPER AND PRODUCTION THEREOF

BACKGROUND OF THE INVENTION

1. Field of the Invention

The present invention relates to embossed process paper for transfer which, when producing a dry type of synthetic leather, is used as a medium for extracting the gloss, embossment, handling, etc. of the surface thereof, said synthetic leather having been widely used for a variety of articles such as shoes, bags, clothes, furniture and golf bags as well as for interior finish and interior trimming, and method for making such paper.

2. Statement of the Prior Art

In general, a dry type of synthetic leather products have been produced in the following manner. Process paper having a releasable resin laminated on the surface of backing paper is first provided. Then, a solution composed mainly of such a synthetic resin as vinyl chloride or urethane resin is coated and pre-dried on the releasable resin of the process paper. Subsequently, a backing material (fabric)—such as a staple fiber fabric, a mixed fabric of staple with polyester fibers, a knit fabric of nylon tricot, etc. and an nonwoven fabric of a mixture of staple fibers with polyester or polyamide resin—is pressure-laminated on the pre-dried product through an adhesive, followed by heating and drying. Finally, the process paper is released from the end product.

The embossing on the surface of such a dry type of synthetic leather may be achieved by a direct process wherein the synthetic leather is manually crumpled, embossed or stretched, or an indirect process wherein process paper pre-embossed to have an embossed pattern is used to transfer that embossed pattern on the synthetic leather. The latter indirect process now prevails, because it is superior to the former direct process in terms of the texture homogeneity, gloss variation, handling and other factors of the finished synthetic leather product.

The production of such process paper having an embossed pattern on the surface has so far been carried out in two steps. At the first step, a releasable resin is laminated on the surface of backing paper to make a flat type of process paper in which the back side of the backing paper and the surface of the releasable resin are both flat. Then, at the second step, this flat type of process paper is passed between an embossing roll and a rubber roll, or guided between a pair of a male-female type of embossing rolls designed to mesh with each other, just as would be in the case of gears, for moisture conditioning, heating and embossing (patterning). At this second step, the latter indirect process is superior to the former direct process in terms of the depth and clearness of the embossments. However, both the techniques are subject to some unavoidable limitation as to the depth and homogeneity of the embossments, because the flat type of process paper made of the releasable, already solidified resin and the backing paper is further processed by an additional embossing machine. In other words, the depth of the embossment imparted on the flat type of process paper by conventional techniques is up to about 60%, as expressed in terms of the effective transfer percentage with respect to the depth of the embossment provided on the embossing roll. In this regard, see Japanese Patent Laid-Open No. 58-25926, page 4; entitled "Method and apparatus for carrying out surface transfer on releasable coats on supports as well as release sheets". A variation in this effective transfer percentage is largely attributable to gloss variations, satinizing and lack of handling of synthetic leather. With the conventional techniques, it is also impossible to emboss only the releasable resin laminated on the backing paper; the backing paper is unavoidably embossed. Thus, the resulting embossed process paper tends to occasion "paper-making defects" such as fish eyes, bubbles, water streaks, sagging, ribs, satinizing and contamination, which otherwise come to appear in the form of "embossing defects" such as tensional wrinkles and wavy edges. As a result, it is impossible to obtain any uniform synthetic leather surface, when a solution composed mainly of vinyl chloride or urethane resin is coated on the releasable resin of the embossed process paper. In addition, the backing paper is deprived of the embossment by heating while the process paper is passed through the steps of heating and drying that solution, and this in turn causes deprivation of the embossment from the releasable resin, reducing the number of recycling of the process paper. Moreover, due to the fact that the backing paper is embossed, the backing paper-forming fibers are torn off during embossing through an embossing machine, causing a drop in the strength of backing paper and reducing the capability of the backing paper to be recycled. As the releasable resin to be laminated on the surface of the backing paper, polypropylene may be used alone. However, the polypropylene, if extruded at a temperature enough high to enable lamination, suffers a considerable variation in extrusion and tends to surge. For this reason, there is no choice but to incorporate in that resin a high-pressure low-density polyethylene in an amount of usually about 10–20%, although the resulting product is softer in a solidified state than that obtained with the sole use of polypropylene. This leads to another defect of the conventional process paper that it suffers premature thermal degradation at the steps of heating and drying a solution composed mainly of a synthetic resin and coated on the releasable resin.

The present invention seeks to provide embossed process paper which is substantially free from the above-mentioned defects of the prior art process paper and is less expensive and superior in performance to the prior art product, and a method for making such embossed process paper under conditions rationalized in view of industrial and economical considerations.

SUMMARY OF THE INVENTION

In summary, the present invention is directed to an improvement in or relating to the invention set forth in Japanese Patent Laid-Open No. 61-242820 which was laid open for public inspection under the name of the present applicant and claims "a laminating method characterized in that a resinous composition comprising 60–95% by weight of a polypropylene having a melt flow rate of 5–100 g/10 min. and 5–40% by weight of a long chain branch-containing polyethylene having a melt flow rate of 0.2–40 g/10 min. is coextruded together with a polypropylene homopolymer having a melt flow rate of 1–100 g/10 min. to laminate said resinous composition on a substrate".

According to one aspect of the invention, there is provided an embossed process paper for transfer, adapted to be used for forming a dry type of synthetic leather, which includes a backing paper, a mixed resin of polypropylene with polyethylene laminated on the surface of said backing paper and a homopolypropylene resin laminated on the surface of said mixed resin, both said resins being laminated at a total resin coat thickness of 30 to 120 μm, the thickness of said mixed resin accounting for 50 to 20% of said total resin coat thickness and the thickness of said resin accounting for 50 to 80% of said total resin coat thickness, both said resins having thereon a given embossed pattern having a depth of 20 to 150 μm, and said backing paper having a smooth back side.

According to another aspect of the invention, there is provided a method for making embossed process paper for transfer, adapted to be used for forming a dry type of synthetic leather, which comprises the steps of:

extruding a mixed resin of polypropylene with polyethylene onto the surface of a backing paper to a thickness accounting for 50 to 20% of a total resin coat thickness of 30 to 120 μm and, at the same time, extruding a homopolypropylene resin onto the surface of said resin to a thickness accounting for 50 to 80% of said total resin coat thickness, through a coextruder for lamination, and just thereafter, passing the resulting laminate between a cooling roll having a given pattern having a depth of 20 to 150 μm embossed thereon and a press roll built up of a flat roll, while the back side of said backing paper is in contact with said press roll, thereby laminating together, embossing and solidifying said resins.

BRIEF DESCRIPTION OF THE DRAWINGS

The above-mentioned and other objects and features of this invention and the manner of attaining them will become apparent, and the invention itself will be best understood by reference to the following description of the embodiment of the invention in conjunction with the accompanying drawings, wherein.

ILLUSTRATIVE EXPLANATION OF THE INVENTION

Figure 1:
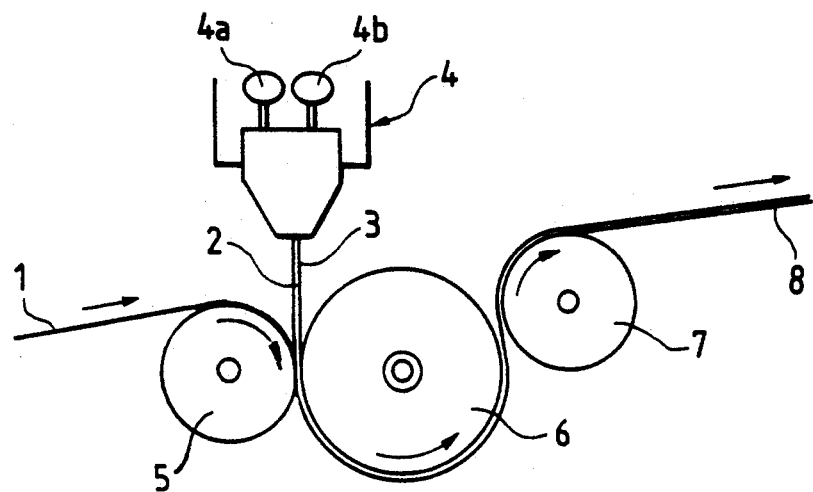
FIG. 1 is a diagrammatic sketch illustrating how to make the embossed process paper of this invention by the method of this invention.
Figure 2:
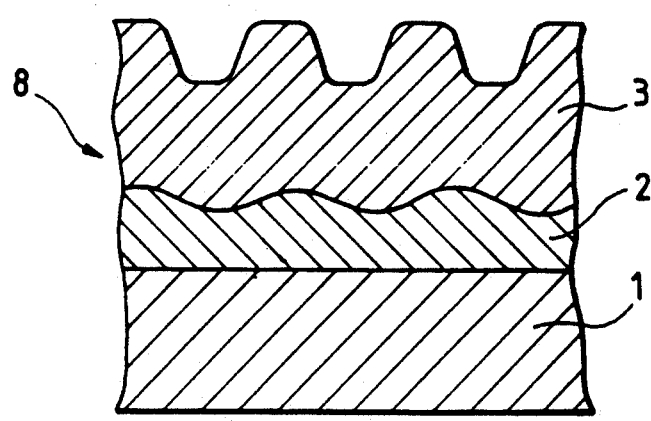
FIG. 2 is a sectional sketch illustrating the embossed process paper according to this invention on an enlarged scale.

With reference to FIG. 1, there is diagrammatically illustrated the inventive method for making patterned process paper. For backing paper shown at 1, use is made of heat-resistant, neutral paper having a weight of 100-300 g/m², which is preferably treated by corona discharge just before guided just below a coextruder 4. Shown at 2 is a mixed resin of polypropylene with polyethylene, which comprises 60-95% by weight of a polypropylene having a melt flow rate of 5-100 g/10 min. and 5-40% by weight of a long chain branch-containing polyethylene having a melt flow rate of 0.2-40 g/10 min. This mixed resin is laminated on the surface of the backing paper 1 through a first extruder 4a of the coextruder 4. Shown at 3 is a homopolypropylene resin having a melt flow rate of 1-100 g/10 min., which is extruded through a second extruder 4b of the coextruder 4. The mixed resin 2 and homopolypropylene resin 3 are extruded at a total resin coat coverage of 30-120 μm, with the thicknesses of the resin 2 and homoploypropylene resin 3 accounting for 50-20% and 50-80% of the total coat thickness, respectively. Shown at 5 is a press roll for guiding the backing paper 1 just below the coextruder 4, which is built up of a flat roll having a smooth surface. Shown at 6 is a cooling roll located just below the coextruder 4 and including thereon a pre-embossed, given pattern having a depth of 20-150 μm. The backing paper 1 laminated thereon with the mixed resin 2, together with the homopolypropylene resin 3 laminated on the resin 2, is coextruded through the coextruder 4 for lamination. Just thereafter, the resulting laminate is passed between the press roll 5 and the cooling roll 6 to fix the resins 2 and 3 to the backing paper 1 and emboss and solidify the laminate. It is noted that reference numeral 7 represents a release roll located on the side of the cooling roll 6 opposite to the press roll 5 for separating the laminate from the cooling roll 6, and 8 stands for a dry type of embossed process paper for transfer made by the above-mentioned equipment according to this invention, which is used for forming synthetic leather.

Reference will now be made to how to make the embossed process paper for transfer according to this invention with such equipment.

1) SELECTION AND PROPORTION OF RESIN USED

As disclosed in the above-mentioned Japanese Patent Laid-Open No. 61-242820, the mixed resin 2 of polypropylene with polyethylene is extruded through the first extruder 4a of the coextruder 4 onto the surface of the backing paper 1 to prevent surging and improve on ductility and neck-in, and the homopolypropylene resin 3 is extruded through the second extruder 4b of the coextruder 4 onto the surface or release side of the resin 2, thereby improving gloss variations and surface roughening (ribbing and spotting etc.) phenomena which are pending problems of the conventional process paper caused by the ill compatibility of the mixed resin of polypropylene with polyethylene. Cost reductions are achieved by allowing the mixed resin 2 extruded onto the surface of the backing paper 1 to account for 50-20% of the total resin coat thickness and the homopolypropylene resin 3 extruded onto the surface or release side of the resin 2 to account for 50-80% of the total resin coat thickness; allowing the homopolypropylene resin 3—which is more economical (less expensive) than the mixed resin 2 of polypropylene with polyethylene—to account for a half or more of the total resin coat thickness. In addition, since the homopolypropylene resin 3 show heat resistance, releasability and wear resistance superior to those of the mixed resin 2 in the process of forming synthetic leather, the resulting process paper can be provided with increased frequency in use. Reference will now be made to the reasons that the mixed resin 2 must account for 50-20% of the total resin coat thickness and the resin 3 must account for 50-80% of the total resin coat thickness. When the mixed resin 2 accounts for less than 20% of the total resin coat thickness, it is too thin to play a binder role in binding the resin 3 to the backing paper 1—which is essentially required in this invention, and has no effect upon preventing neck-in of the resin 3 coextruded. When the mixed resin 2 accounts for higher than 50% of the total resin coat, the amount of the resin 3 is too low to produce an economical effect, and the resin 3 is unable to produce its own properties; heat resistance, releasability and wear resistance.

2) OPERATIONAL CONDITIONS

A) Resin Temperature

As already stated, the mixed resin 2 consisting of 60–95% by weight of a polypropylene having a melt flow rate of 5–100 g/10 min. and 5–40% by weight of a long chain branch-containing polyethylene having a melt flow rate of 0.2–40 g/10 min. and the homopolypropylene resin 3 consisting of a polypropylene homopolymer having a melt flow rate of 1–100 g/10 min. are coextruded in this invention. The first extruder 4a for the mixed resin 2 operates at a resin temperature of 290°–320° C., while the second extruder 4b for the homopolypropylene resin 3 works at a resin temperature of 280°–300° C. Temperature of the second extruder 4b is preferably decreased to 10°~20° between the first and second extruders 4a and 4b increases the strength of adhesion to the backing paper 1 and decreases the degree of oxidization of the release side.

B) Line Speed

According to this invention, the mixed resin 2 of polypropylene with polyethylene is extruded on the surface of the backing paper 1 concurrently with the homopolypropylene resin 3 extruded on the surface of that resin 2 for lamination, immediately after which the laminate is passed between the cooling roll 6 having a given pattern pre-embossed thereon and the flat roll 5, while the back side of the backing paper 1 is in contact with the flat roll 5, thereby achieving the tight lamination, embossing and solidification of the resins 2 and 3. Thus, the resin melts are forced into the deepest portions of the embossment on the cooling roll 6, corresponding to the density and depth thereof. In order to prevent paper breaking during operation, the line speed should preferably be limited to up to about 100 m/min. for a shallow, say, 20 to 70 μm deep embossment and to up to about 20 m/min. for a deep, say 100 to 150 μm deep embossment.

3) HOW TO EMBOSS AND TEMPERATURE CONDITION FOR COOLING ROLL

According to the embossing system of this invention wherein the resins 2 and 3 are concurrently laminated together, embossed and solidified in an in-line manner, it is not needed to devide the process into two steps, as carried out in the prior art; the resins are pressed direct against the cooling roll 6 for embossing, so that an effective transfer rate of almost 100% is obtained. Thus, this invention is much more improved in terms of the effective transfer rate than the prior art, and makes the resulting process paper 8 rich in smoothness and homogeneity, because the back side of the backing paper 1 is fully smoothened. For this reason and because of cost reductions and improvements in heat resistance and releasability achieved by the use of the polypropylene resin 3, it is also possible to increase the number of recycling of the process paper for the process for dry-producing synthetic leather.

The temperature of cooling water fed into the barrel of the cooling roll 6 is preferably in the range of 16° C. to 38° C., because at 15° C. or lower paper breaking is likely to occur due to rapid cooling, while at 40° C. or higher the backing paper curls severely, possibly causing paper breaking.

The following experimentation was performed to learn the performance of the process paper made by the present method as disclosed herein.

EXPERIMENT 1

A mixed resin 2 of polypropylene with polyethylene was extruded onto the surface of a 123 μm thick backing paper at 310° C. and a line speed of 25 m/min. through the first extruder 4a of the coextruder 4, concurrently with a homopolypropylene resin 3 extruded on the surface of the resin 2 at 290° C. and the same line speed through the second extruder 4b of the coextruder 4, each in an amount so as to account for 50% of a total resin coat thickness of 127 μm. immediately thereafter, the laminate was guided between a cooling roll 6—which was almost uniformly provided thereon with a 120 μm deep spotted embossment and through which cooling water 23° C. passed—and a press roll 5 built up of a steel flat roll to laminate together, emboss and solidify the resins 2 and 3 concurrently in an in-line system, thereby making process paper 8.

For the purpose of making comparative process paper, the above-mentioned procedures were also followed with the exception that another feed of the mixed resin 2 was extruded at 310° C. through the second extruder 4b of the coextruder 4.

In order to determine how many times these process papers are recyclable, they were exposed to each of varied temperatures for 10 minutes to measure their surface gloss with a glossimeter (VG-10 made by Nippon Denshoku Kogyo K. K.). The results were reported in Table 1.

TABLE 1

|  | Process paper 8 | Comparative process paper |
| --- | --- | --- |
| Initial gloss | 23.0 | 23.0 |
| 150° C. | 23.0 | 22.5 |
| 155° C. | 23.5 | 19.0 |
| 160° C. | 25.0 | 15.5 |
| 170° C. | largely varied | largely varied |

From these results, it is noted that the present process paper 8 is superior in heat resistance and the number of recycling to the conventional, comparative process paper, even when it is heated and dried at a temperature higher than that used conventionally.

EXPERIMENT 2

In order to learn the degree of thermal degradation of the process paper 8 made in Experiment 1, it was 10 times repeatedly heated in the atmosphere at 140° C. for five minute for warp and weft tensile and tear strength tests. The results are set out in Table 2.

TABLE 2

|  | Warp | Weft |
| --- | --- | --- |
| Tensile strength test | 19.5 kgf/15 mm | 12.0 kgf/15 mm |
| Tear strength test | 170 gr | 181 gr |

These results show that the present process paper 8 is much superior in tensile and tear strengths to the conventional, comparative process paper, indicating that a dry type of high-quality synthetic leather can be produced by the use of the present process paper, because very high tension can be applied thereto.

As recounted above, the process paper according to this invention and the method for making it have the following various merits and so are of great industrial value.

1) The present process paper is much improved in terms of heat resistance and releasability and the number of recycling at the time of forming synthetic leather, because the embossed side (release side) is formed of a homopolypropylene resin having a hardness (JISK 7202) and melting temperature higher than those of the conventional material (a polypropylene/poly-ethylene mixture).

2) Since the mixed resin of polypropylene with polyethylene is extruded onto the surface of backing paper concurrently with the homopolypropylene resin extruded onto the surface of the mixed resin to simultaneously laminate together, emboss and solidifying both the resins, the resin melts become bulky by contact with the projections of the embossment on the embossing roll, increasing the total resin thickness. In addition, the resulting resin coat has the property of retaining the original shapes of the two layers and comes to have an effective transfer rate of almost 100%, thus making it possible to have a deep embossment. This also renders it possible to achieve homogeneous transfer of an embossment for high-grade calf, kid, kip types and type of leather products required to have a relatively shallowly, finely and homogeneously spotted-pattern.

3) With the embossed process paper made by this invention having a completely flat back side, it is constantly possible to obtain embossed synthetic leather in a homogeneous and stable state, because it is free from "paper-making defects" appearing on the back side due to off-embossing such as fish eyes, bubbles, water streaks, sagging, satinizing, ribs and contamination, which otherwise come to appear in the form of "off-embossing defects" such as tensional wrinkles and wavy edges.

What is claimed is:

1. An embossed process paper for transfer, adapted to be used for forming a dry type of synthetic leather, which includes a backing paper (1), a mixed resin (2) of polypropylene with polyethylene laminated on the surface of said backing paper (1) and a homopolypropylene resin (3) laminated on the surface of said mixed resin (2), both said resins being laminated at a total resin coat thickness of 30 to 120 μm, the thickness of said mixed resin (2) accounting for 50 to 20% of said total resin coat thickness and the thickness of said resin (3) accounting for 50 to 80% of said total resin coat thickness, both said resins having thereon a given embossed pattern having a depth of 20 to 150 μm, and said backing paper (1) having a smooth back side.

2. A method for making embossed process paper for transfer, adapted to be used for forming a dry type of synthetic leather, which comprises the steps of:

extruding a mixed resin (2) of polypropylene with polyethylene onto the surface of a backing paper (1) to a thickness accounting for 50 to 20% of a total resin coat thickness and, at the same time, extruding a homopolypropylene resin (3) onto the surface of said resin (2) to a thickness accounting for 50 to 80% of said total resin coat thickness, said resin (2) and said resin (3) being together at a total resin coat thickness of 30 to 120 μm, through a coextruder (4) for lamination, and just thereafter, passing the resulting laminate between a cooling roll (6) having a given pattern having a depth of 20 to 150 μm embossed thereon and a press roll (5) built up of a flat roll, while the back side of said backing paper (1) is in contact with said press roll (5), thereby laminating together, embossing and solidifying said resins (2, 3).

3. A method as claimed in claim 2, wherein said mixed resin (2) is coextruded at a temperature of 290° to 320° C. through a first extruder (4a) of said extruder (4) and said homopolypropylene resin (3) is coextruded at a temperature of 280° to 300° C. through a second extruder (4b) of said extruder (4), said coextrusion being carried out at said second-mentioned temperature lower than said first-mentioned temperature by 10° to 20° C.

* * * * *